May 12, 1953 G. S. STRATTON 2,637,920
BARRIER FOR MOTOR VEHICLE PARKING SYSTEMS
Filed April 28, 1949 2 Sheets-Sheet 1

INVENTOR.
GLEN S. STRATTON
BY J. A. Grier
ATTORNEY

May 12, 1953
G. S. STRATTON
2,637,920
BARRIER FOR MOTOR VEHICLE PARKING SYSTEMS
Filed April 28, 1949
2 Sheets-Sheet 2
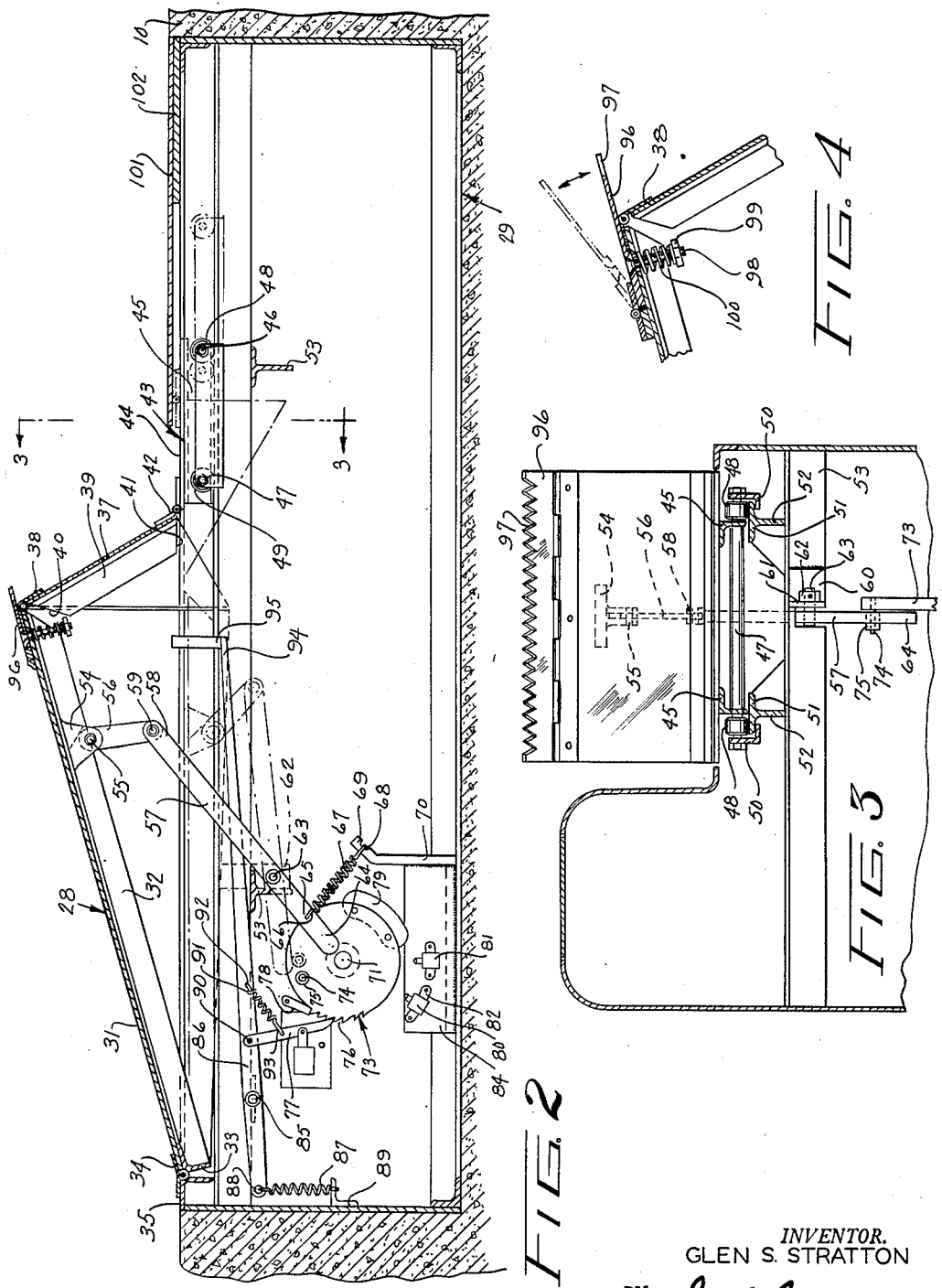
INVENTOR.
GLEN S. STRATTON
BY
J. G. Guion
ATTORNEY Patented May 12, 1953

2,637,920

UNITED STATES PATENT OFFICE 2,637,920

BARRIER FOR MOTOR VEHICLE PARKING SYSTEMS

Glen S. Stratton, New York, N. Y.; Robert M. Stratton, Cook County, Ill., administrator of said Glen S. Stratton, deceased, assignor to Richard H. Hallsted, New Canaan, Conn., trustee Application April 28, 1949, Serial No. 90,132

12 Claims. (Cl. 39—6)

This invention relates to improvements in motor vehicle parking systems and has for a principal object the provision of a parking system embracing an area into which any vehicle may freely enter, but which each vehicle is prevented from leaving until a barrier means is displaced by coin-controlled means conveniently located near said barrier means, said coin-controlled means being so positioned that the operator of each vehicle may insert a coin therein without having to leave his seat.

Another object of the invention is the provision, in a motor vehicle parking system of a two-way passage into and out of a parking area, said passage being so arranged that vehicles may freely enter said area via said passage, displacing a barrier while doing so, said barrier being only displaceable for vehicles leaving said passage, by power-driven means set into operation by the insertion of a coin in an adjacent coin receptacle.

Another object of the invention is the provision of a vehicle parking system including a passageway communicating with a parking area, barrier means in said passageway adapted to be freely displaced by vehicles passing therethrough in one direction and adapted only to be displaced by coin-controlled motor-driven mechanism to permit vehicles to pass therethrough in the opposite direction.

Another object of the invention is the provision in a motor vehicle parking system of a two-way passage into and out of a parking area, said passage being so arranged that vehicles may enter said area via said passage after a barrier in said passage has been displaced by power-driven means set into operation by the insertion of a coin in an adjacent coin receptacle, said vehicles being adapted to freely leave said area via said passage displacing said barrier while doing so.

Yet another object of the invention is the provision in a parking system, of the character described, of means under control of an attendant for displacing the barrier and maintaining the same in displaced relation as long as desired, said attendant being adapted to disable said means, thereby restoring the coin-controlled mechanism so that vehicles may be singly removed from said area via said passage by displacing said barrier under control of said coin-controlled motor-driven mechanism.

A further object of the invention is the provision in a motor vehicle parking system of a two-way passage into and out of a parking area, said passage including a displaceable barrier under control of motor-driven mechanism set into operation by an operator of a vehicle desiring to leave said area, by the insertion of a coin in a receptacle therefor and thereby initiating a series of operations, one of which is the displacing of said barrier to a position where the wheels of the vehicle may roll over or traverse the barrier, the weights of vehicles entering said area via said passage being adapted to automatically displace said barrier downwardly while doing so.

A further object of the invention is the provision of a parking system of the character described which includes red and green signal lights, one set facing vehicles desiring to enter the area and another set facing vehicles desiring to leave the area, the first set being normally green and giving the right of way to vehicles desiring to enter the area, the second set being normally red and changed to green by means controlled by the insertion of a coin, thereby indicating to the vehicle desiring to leave that it has the right of way, the first set having been changed to red in time with the change of the second set to green and remaining red for the duration of the green light in the second set, thereby halting the vehicles desiring to enter.

Other objects and advantages of the invention will be apparent to those skilled in the art upon a study of the following specification and the accompanying drawings.

Referring to the drawings, which are merely given by way of example to illustrate the invention and how to practice it:

Figure 2 is a cross-sectional elevation taken on a longitudinal median line of the barrier showing structural details of one form of barrier employed in my new and improved system;

Figure 3 is an elevation partly in section taken along the lines 3—3 of Figure 2;

Figure 4 is an enlarged fragmentary view showing a mental hazard which is positioned on the barrier and forming the highest point thereof when the barrier is functioning as a barrier per se.

Figure 1:
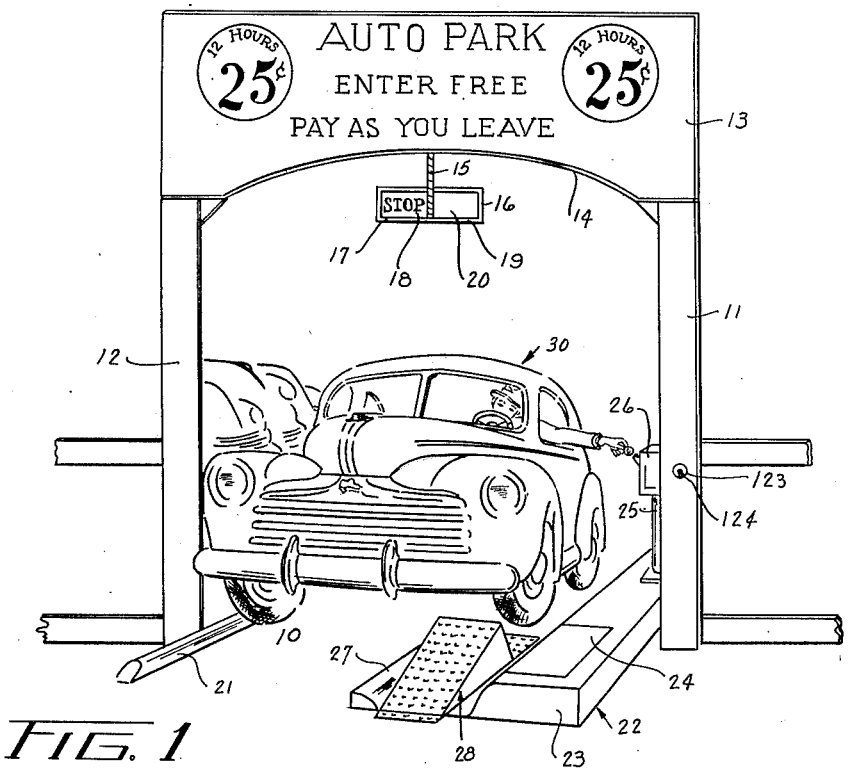
Figure 1 is a perspective view of the two-way entrance and exit forming a part of my new and improved parking system showing a barrier in the path of the wheels on the operator's side of the vehicle and showing the operator inserting a coin into the coin-controlled mechanism for leveling the barrier so that said left wheels may roll thereover.

Referring first to Figure 1, the passage 10 to and from the parking lot is bounded by upright members 11 and 12 which may support a signboard 13.

The lower surface 14 of the signboard may be in the form of an arch, and extending downwardly therefrom is a vertical support 15 to which is secured a housing 16 the interior of which is divided into two compartments. In each compartment is a lamp. Wires leading to the two lamps may pass to the housing via the support 15 which may be a steel conduit. Each of the compartments has open sides each of which contains a colored glass or lens. For example, the left compartment 17 as seen in Figure 1 is provided with a red glass or lens 18 which may also have lettered thereon the word "stop" and in its opposite face a green glass or lens having the word "go" thereon. The right compartment 19 has a green glass or lens 20 which may have the word "go" lettered thereon, and on the opposite side it may have a red glass or lens with the word "stop" lettered thereon. Only one compartment, however, is illuminated at a time to make the signal visible.

Formed along the left edge of the passage 10, as seen in Figure 1, is a curb 21. Formed along the right side of the passage 10 is a curb structure 22 which has a portion 23 extending substantially above the surface of the passage 10 and having a compartment formed therein to contain mechanism which will presently be described for making it possible for vehicles to leave the area via the passageway 10. This portion is provided with a steel cover 24. This portion also supports a pedestal 25 which carries on its upper end a suitable coin-controlled mechanism 26.

Preferably formed integral with the portion 22 is a curb portion 27 which is spaced apart from the projecting portion 23 sufficiently to accommodate a barrier-forming member 28. The member 28 is shown in its normal position in Figure 1, in which position it forms a barrier against the driving of a vehicle through the passage 10. Mechanism to be presently described is provided for moving the exposed elements of the barrier downwardly and on a common plane. This mechanism is set in motion by the deposit of a coin in the coin-controlled mechanism 26. Normally, the light in the compartment 19 is on, and it shows green through the glass or lens 20 to indicate that vehicles wishing to enter the parking area have the right of way. The compartment opposite the compartment 19, facing inwardly of the parking area, is normally red, so that the driver of the vehicle, such as the vehicle 30, desiring to leave the parking area, stops the vehicle so that he can conveniently reach the coin-controlled mechanism 26. When he deposits the coin four things occur:

First, the light in the compartment 17 is turned on and the one in compartment 19 is turned off, thereby directing vehicles desiring to enter to stop;

Secondly, the mechanism, which is also set in motion by the deposit of the coin, moves the barrier down to a substantially flat plane so that the vehicle can roll over it;

Thirdly, the signal lights on the opposite faces of the compartment 16 function as follows: The light which is normally red is extinguished and the green light is turned on, indicating to the driver of the vehicle that he has the right of way; and Fourth, as the rear wheel of the vehicle passes over the then flattened barrier the barrier restores itself and the signal light facing the interior of the parking area changes from green to red, the signal lights 18 and 20 change from red to green indicating to the vehicles desiring to enter the parking area that all is clear as soon as the leaving vehicle passes by. A modification of this, not shown, contemplates providing a timed delay in the mechanism for changing the lights 18 and 20 so as to give the leaving vehicle time to pass out before the green signal gives the right of way to any incoming vehicles.

Referring now to Figures 2, 3 and 4, the barrier device 28 includes a hollow casing 29 which is set into the surface of the terrain 10 and of which the bottom and sides are formed of structural steel angles and plates. The barrier device includes an elongated plate member 31 which may be framed by angle members, such as the angle members 32, 33. A hinge 34 is secured to the end plate member, as seen in Figure 2, and is also secured to a fixed cross-member 35 which may form an integral part of the casing 29. The side members on the plate 31 on their right ends are beveled, as at 36.

A plate member 37, similar to the plate member 31 except that it is shorter in length, has its upper end secured to a hinge member 38 which is in turn secured to the right end of the plate member 31. The plate 37 has side angle members 39, both ends of each of which are beveled, as at 40 and 41. The lower end of the plate 37 is secured to a hinge member 42, and this hinge member is in turn secured to the left end of a movable channel member 43. The member 43 is comprised of an upper plate 44 and opposite L-shaped channels, one of which is shown at 45, secured thereto. Secured to the L-shaped channels 45 are oppositely disposed shafts 46 and 47 which respectively have journaled thereon rollers 48 and 49. Extensions of the shafts 46 and 47 support L-shaped members 50 which extend under the horizontal portions 51 of the T-shaped rails 52 and function as hold-downs. The rails 52 are supported on cross-members 53 in the casing 29.

By this arrangement will be seen that normally the barrier device 28 is in the position shown in Figure 2. Now, when a vehicle is being driven into the area via the passage 10 the weight of the wheels of the vehicle acting against the plate 31 causes the plate 31 to swing downwardly in a clockwise direction, and while doing so the member 43 is rolled to the right by the plate 37 which functions somewhat like a connecting rod, thereby the three members 31, 37 and 43 are disposed in a horizontal plane.

Now, for vehicles leaving the parking area via the passage 10, a different means is provided for bringing the members 31, 37 and 43 into a horizontal plane, and the means for doing this will now be described:

The plate member 31 has a bifurcated boss 54 secured to the under surface thereof, and a shaft 55 extends through aligned holes formed therein. Pivotally mounted on the shaft 55 is a link member 56. A bar 57 has its upper end 58 bifurcated, and a clevis pin 59 extends through aligned holes formed therein and through a hole formed in the lower end of the link 56. The member 53 has a cutaway portion 60 therein, and a cross-member 61 is welded or otherwise secured thereto. The cross-member 61 has a boss 62 thereon and carries a stud shaft 63. The bar 57 has a hole therein which forms a working fit on the stud shaft 63.

The lower end 64 of the bar 57 is rounded, as shown in Figure 2, and near this lower end the bar has a small hole 65 formed therein which is engaged by one end 66 of a spring 67. The other end 68 of the spring engages an extension 69 of a vertical upright member 70.

A shaft 71, suitably supported in the casing 29, is rotated by means of an electric motor 72. Carried on the shaft 71 is a disc 73 which carries a crank pin 74 upon which is journaled a roller 75. The disc 73 has formed in the periphery thereof a series of notches 76 which are adapted to be engaged by a pawl 77, to be presently described, and also engaged by a holding pawl 78, which will presently be described. The disc 73 also has formed on and extending beyond the periphery thereof a cam 79 which is adapted to cooperate with switches 80 and 81 in a manner to be presently described. The switches 80 and 81 are supported by screws 82 extending through arcuate slots 83 formed in a plate member 84 which is welded or otherwise secured to the framework of the compartment 29 and to the upright member 70.

A shaft 85 is suitably supported within the compartment 29 and has journaled thereon a bar member 86 which is normally urged in a counter-clockwise direction about the shaft 85 as an axis due to the urge of a spring 87, one end of which is connected to the end 88 of the bar member, and the other end of which is connected to a bracket 89. The pawl 77, referred to above, is pivotally connected to the bar member 86 by means of a clevis pin 90. A spring 91 has one end connected to the bar member 86 at the point 92 and the other end is connected to the pawl 77 via a hole 93 formed therein; thus, the pawl 77 is maintained in engagement with the disc 73. The end 94 of the bar member 86 has an extension 95 which normally extends above the upper surface of the compartment 29. The function of this extension will presently be described in connection with the operation of the device.

On the upper end of the plate 31, as seen in Figure 2, is hingedly mounted a plate 96 having a serrated edge 97 which projects toward a vehicle wishing to leave the parking area via the passage 10, and this hinged plate constitutes what might be termed a mental hazard. Since the plate 96 is hingedly secured on the plate 31 the wheel of the vehicle coming against it would tend to swing it upwardly, and therefore the tire on such wheel would not be damaged at all. The plate 96 has hinged rods extending through corresponding holes formed in the plate 31. One of these rods is shown at 98 in Figure 4. Embracing the rod 98 is a spring 99, and threadedly engaging the rod is a pair of locking nuts 100 by means of which any desired urge may be imposed upon the plate 96 by the spring 99.

When the barrier device 28 is flattened or moved downwardly into horizontal plane, the channel member 43 with its rollers 40 and 49 is moved to the right, as seen in Figure 2, to the dot-dash position. The structure is provided with a fixed plate 101 which is disposed sufficiently above the lever of the channel member 43 to clear the hinge 42 so that the channel member 43 may be freely moved along below this plate. When the vehicle leaving the parking area is driven in a direction approaching the barrier, its left front wheel comes to rest on the plate 101 when the operator stops to insert the coin, and since there is clearance between the plate 101 and the movable channel member 43, the latter is free to move when the mechanism controlled by the coin functions to flatten out the barrier. Plate 101 may be rigidly supported on auxiliary plate members such as the one shown at 102.

Figure 5:
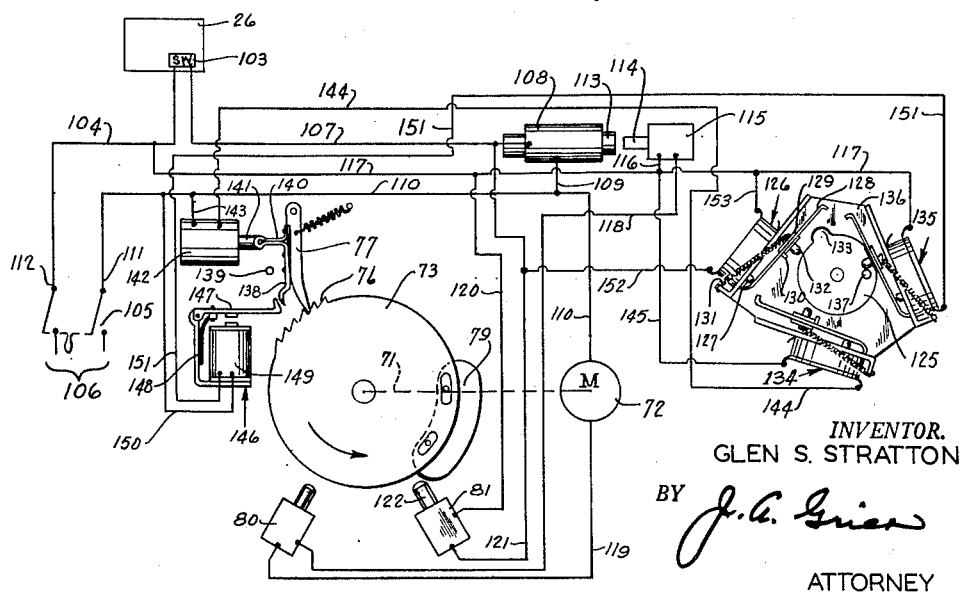
Figure 5 is a circuit diagram showing the control and other electrical circuits employed in my system.

Referring now to Figure 5, which is a circuit diagram of my system, the coin box 26 includes a switch indicated diagrammatically at 103. This switch may be of a type which is momentarily closed by the impact of coin passing into the coin box through a suitable chute, not shown. This switch has one terminal connected via a wire 104 to a terminal 112 of a main switch 105 which controls the connection of the system to a source of power 106. The other terminal of the coin switch 103 is connected via a wire 107 to one terminal of a solenoid 108. The other terminal of the solenoid 108 is connected via a branch wire 109 and a wire 110 which is connected to the other side of the terminal 111 of the switch 105.

When a coin is dropped into the coin box the switch 103 is momentarily closed, thereby energizing the solenoid 108 and causing the plunger 113 to impinge against the end of a plunger 114 of a switch 115. The switch 115 is a ratchet type of switch which is closed when the plunger 114 is depressed and which is opened the next time the plunger 114 is depressed, etc. The switch 115 is connected via a branch wire 116 to a conductor 117 which has one end connected to the wire 104 (ahead of the switch 103). The other terminal of the switch 115 is connected via a wire 118 to one terminal of the switch 80 which is normally closed but it is opened and held open by the cam 79 until the switch 81, to be presently described, is open. The other terminal of the switch 80 is connected via a wire 119 to one terminal of the motor 72. The other terminal of the motor 72 is connected to the wire 110 so that when the switch 115 was closed by the depression of its plunger 114 the motor 72 starts operating.

The switch 81 has one terminal connected via a wire 120 to the wire 117, and its other terminal is connected via a wire 121 to the wire 107. The switch 81 is normally open, and is closed by the cam 79. The plunger 122 is spring-loaded to return to its extreme outward position, and when the stem is in that position the switch is open. Therefore, it is only closed by and during the duration of its engagement by the cam 79.

In tracing the connections 120 and 121 it will be noted that the switch 81 is in parallel with the switch 103, and its function is to supply the solenoid 108 with energy when it is desired to open the switch 115. Therefore, when the cam 79 closes the switch 81 the solenoid receives current and its plunger 113 depresses the plunger 114 of the switch 115, thereby depriving the motor 72 of energy.

While the motor 72 is in operation it rotates the disc 73 to a point where the crank pin 74 is in its uppermost position, and the crank pin in turn has by that time swung the bar 57 upwardly to the position shown in Figure 2, thereby causing the barrier device to flatten so that it may be traversed by the wheels of a vehicle desiring to leave the parking area. As the vehicle passes over the flattened barrier device the front wheel imparts an impulse to the pawl 77 via the extension 95 and the bar member 86 and thereby advances the disc one increment. However, it will be noted that the bar 57 is still retained in its upper position because the crank pin 74 has not been moved far enough to release it. When the rear wheel of the vehicle passes over the flattened barrier a second impulse is imparted to the pawl 77, thereby advancing the disc 73 another increment. The sum of these two increments results in the movement of the crank pin to a position where the bar 57 is released, and it moves to its downward position, thereby allowing the barrier to return to its original or normal position.

It will be understood that the herein described apparatus may be installed in reversed relation so that the drivers of vehicles may pay as they enter instead of paying as they leave. In this case the barrier would be against vehicles desiring to enter the parking area through the passage 10, and the barrier would be displaced by the insertion of a coin in the coin box 26 to flatten it out so that the vehicle may drive in.

In instances where an attendant is on duty during certain periods and collects from the vehicles either entering or leaving, the object is to cause the barrier to assume its flat position and remain so. A lock barrel 123 may be conveniently locked, for example in the upright 11. Although this lock or lock barrel may be of any type, I prefer to use a lock barrel of the type generally known as a "Yale" type. The lock barrel has a key passage 124 into which the attendant inserts a key and rotates the interior of the barrel through an arc, say of about 180°, and a cam 125, Figure 5, is rotated therewith in a counter-clockwise direction, as seen in Figure 5, to control a series of switching operations.

A switch 126, which may be of the so-called "micro-switch" type, has an actuating button 127 which is actuated by the depression of a vane 128. The vane has a longitudinal slot therein, and slidably carried on this vane and engaging the slot is a member 129. This member is urged toward a stop pin 130 on the vane by means of a spring 131. The member 129 carries a buffer 132 which is engaged by a lobe 133 on the disc 125, and when the disc is rotated in a counter-clockwise direction, as viewed in Figure 5, the lobe 133 engages the buffer 132 and thereby depresses the vane 128 and in turn the button 127. When the disc 125 is rotated in a clockwise direction the lobe 133 engages the buffer 132 and moves the member 129 longitudinally in the slot in the vane against the urge of the spring 131, and consequently the vane is not displaced to depress the button 127.

The switch 134 is identical with the switch 126, so a detailed description of the same is not deemed necessary.

The switch 135 is also identical except that it is positioned on the plate 136 in reverse order, and its vane overhangs the disc 125 slightly, and a pin 137 in the disc is adapted to actuate the switch 135 only when the disc is rotated in a clockwise direction.

The pawl 77 has secured thereon an extension 138 which cooperates with a trigger to be presently described. Adjacent to the pawl 77 is a stop pin 139 for limiting the movement of the pawl 77 in a clockwise direction. A portion 140 of the extension 138 is pivotally connected to the plunger 141 of a solenoid 142. One terminal of the winding of this solenoid is connected via a wire 143 to the wire 110. The other terminal of this solenoid is connected via a wire 144 to one terminal of the switch 134. The other terminal of the switch 134 is connected via a wire 145 to the wire 117 so that when the switch 134 is closed the solenoid 142 is energized.

An electro-magnetic latch 146 has a latch member 147 which is urged upwardly to a stopped position by means of a spring 148 and is so positioned that the right end of the latch arm 147 is cammed downwardly by the extension 138 on the pawl when the solenoid 142 is energized. As the latch member 147 is cammed downwardly the extension 138 passes over the hooked end thereof and is engaged thereby, and thus the pawl 77 is held out of the range of the ratchet teeth 76. The magnetic latch has a magnetic winding 149 one terminal of which is connected via a wire 150 to the wire 110. The other terminal is connected via a wire 151 to one terminal of the switch 135. The other terminal of the switch 135 is connected to the wire 117 so that when the switch 135 is closed energy is supplied to the winding 149, thereby the latch 147 is attracted downwardly and the hooked end thereof is disengaged from the extension 138 so that the pawl 77 under the urge of its spring resumes engagement with the teeth 76.

One terminal of the switch 126 is connected via a wire 152 to the wire 121. The other terminal of the switch 126 is connected via a branch wire 153 to the wire 117. Thus, the switch 126 is connected in parallel with the switches 81 and 103.

Assuming that the barrier device 28 is in its normal position and, as stated above, the attendant arrives and desires to collect the fees instead of utilizing the coin box, he inserts his key in the lock barrel 123 and rotates it, thereby moving the disc 125 in a counter-clockwise direction, as seen in Figure 5. This causes the lobe 133 to close the switch 126 momentarily and then to close the switch 134 momentarily. As the switch 126 is closed the solenoid 108 is momentarily supplied with energy, and its plunger 133 closes the switch 115, thereby starting the motor 72 into operation and causing the barrier device to flatten. When the switch 134 is closed the solenoid 142 is energized, thereby withdrawing the pawl 77 from the ratchet teeth 76 and causing the extension 138 thereon to be latched up with the latch member 147 so that vehicles passing over the flattened barrier cannot possibly impart any impulses to the ratchet teeth 76 because the pawl is held disengaged therefrom, and thereafter the passage of vehicles into and out of the parking area via the passage 10 is under the supervision of the attendant.

Now, when the attendant is to go off duty he places his key in the lock barrel 123 and turns it in the opposite direction, thereby causing the disc 125 of Figure 5 to rotate in a clockwise direction while returning to its normal position. As the disc rotates in a clockwise direction the lobe 133 on the disc successfully engages the slides 129 on the switches 134 and 126 without actuating the switches per se, and the pin 137 engages and actuates the switch 135, thereby supplying energy to the winding 149 and effecting the release of the pawl 77 therefrom.

The pawl 77 must advance the disc 73 the space of at least two notches to allow the barrier device to be restored to its normal position. However, this is easily effected. For example, if the attendant has his vehicle in the parking area he can merely drive out, and the impulses imparted to the mechanism by his front and rear wheels immediately effect the restoration of the barrier to its normal position, or the first vehicle driving into the area via the passage effects the restoration of the barrier.

Although I have herein shown and described by way of example one embodiment of the invention, it will be obvious that many changes may be made in the arrangements herein shown and described without departing from the spirit of the invention as set forth in the following claims.

What is claimed is:

1. In a device of the character described, a vehicle barrier device normally displaceable by at least one wheel of a vehicle passing therethrough in one direction, which includes at least two plate members having their adjacent ends hinged together, one of said members having its opposite end fixed against lateral and longitudinal movement, the other having its opposite end pivotally connected to horizontal guide means and consequently fixed against lateral movement and movable longitudinally in one plane, means urging at least one of said members in a direction to cause said last-mentioned end to move towards said first-mentioned end to form said barrier, and mechanism acting against the urge of said means for moving said last-mentioned end in the opposite direction for disposing said members in a common plane.

2. The invention according to claim 1, in which said mechanism acting against the urge of said means includes a bar pivotally supported beneath at least one of said plates, a link member connecting one of said plates to said bar, and motor-driven crank means in cooperative relation with the other end of said bar.

3. In a device of the character described, a barrier member normally displaceable by the wheels of a vehicle passing thereover in one direction and comprised of three plate elements hingedly secured together, one of said elements always lying in a horizontal plane, means acting against one of said elements for urging another of said elements upwardly, the third of said elements constituting a horizontal guide means, and mechanism acting against said means for disposing said elements in a substantially horizontal plane, thereby providing a free path for the wheels on one side of a vehicle to pass thereover in a direction opposite said first direction.

4. In a device of the character described, a vehicle barrier device normally displaceable by the wheels of a vehicle passing thereover in one direction and including three plate members, a first of said plate members having one end hingedly connected to one end of a second of said plate members and a third of said plate members having one end hingedly connected to the opposite end of said second plate member, the opposite end of said first member being pivotally connected to a fixed support and the opposite end of the third of said members lying on and guidedly moved along a generally horizontal path and comprising a horizontal guide member, lug means beneath said first plate, a bar pivotally supported beneath said first plate, linkages between one end of said bar and said lug, spring means connected to said bar and urging the hinged end of said first member upwardly, and crank means in cooperative relation with the other end of said bar for moving said first plate member downwardly and consequently disposing the array of members on a substantially horizontal plane, thereby providing a free path for the wheels on one side of a vehicle to pass thereover in a direction opposite said first direction.

5. In a barrier device normally displaceable by at least one wheel of a vehicle passing thereover in one direction, a plurality of plate members serially hinged together, one end member of said series being mounted for movement on a fixed pivotal support, the other end member of said series carrying rollers mounted in a guideway or track on a fixed support, bar means pivotally supported below said first member, link means operatively connecting one end of said bar to said first member for raising the hinged junction of it and its neighbor upwardly, a disc member rotatably supported below the other end of said bar means, a crank pin on said disc member in cooperative relation with said bar means, and motor means for rotating said disc.

6. A device according to claim 5, in which circuits interconnected with said motor means include switching means, and in which said disc member carries cam means cooperating with said switching means to disconnect said motor means when said crank pin has caused said bar means to move to a predetermined position.

7. In a vehicle parking system, a passage communicating with a parking area, barrier means in said passage freely displaceable by vehicles passing therethrough in one direction, means horizontally and to the ground level of the wheels of displacing said barrier for each vehicle whereby at least one wheel thereof may roll thereover in the opposite direction, means restoring said barrier after each of said last vehicles passes therethrough, said means for displacing including electrical circuits and remotely controlled switching means, and key-controlled switching means for effecting the displacement of said barrier independently of said remotely controlled means and maintaining it so displaced.

8. In a device of the character described, a displaceable barrier member comprised of a plurality of plate elements hingedly secured together, one of said elements lying in and guidedly movable along a substantially horizontal plane and the others normally being angularly disposed with respect to each other and above the horizontal plane, motor-driven mechanism operatively connected to said member for disposing all said elements in said horizontal plane, control means for said mechanism comprising electrical circuits including remotely controlled switching means, and key-controlled switching means for controlling said mechanism independently of said first switching means.

9. In a device of the character described, a plurality of plate members serially hinged together, one end member being mounted in a guideway on a fixed support, bar means pivotally supported below said first member, link means operatively connecting one end of said bar means to said first member for raising the hinged junction of it and its neighbor and lowering it, spring means normally urging said first member upwardly, a disc member rotatably supported below the other end of said bar means, a crank pin on said disc member in cooperative relation with said bar means for moving said first members downwardly to a common plane, motor means for rotating said disc, control circuits connected to said motor means and including switching means, cam means on said disc member cooperating with at least one of said switching means, another of said switching means being remotely controlled, and ratchet means partly on said disc and partly on means impulsed by the wheels of a vehicle passing over said barrier device, when the same is displaced, for advancing said disc at least two ratchet steps, thereby releasing said bar means and allowing said barrier device to assume its normal position.

10. The invention according to claim 9, in which said ratchet means includes ratchet teeth on said disc and a pawl on said means impulsed by the wheels of a vehicle, electrically controlled means for swinging said pawl out of the range of said ratchet teeth, magnetically controlled latch means adapted to engage said pawl when it is in said zone, and circuits including key-controlled switching means for bridging the remotely controlled switching means and for energizing said electrically controlled means, thereby effecting the movement of said members to a common plane and preventing said bar means from being released, said key-controlled switching means also being adapted to energize said magnetic latch means for releasing said pawl.

11. A device according to claim 5, in which circuits interconnected with said motor means includes switching means, cam means carried on said disc member cooperating with said switching means to disconnect said motor means when said crank pin has caused said bar means to move to a predetermined position, ratchet teeth formed on said disc, and pawl means supported on a member impulsed by the wheels of a vehicle rolling over said barrier device for advancing said disc and releasing said bar means from said crank pin.

12. A device according to claim 4, in which said first plate member has yieldingly mounted thereon adjacent to its hinged end an element freely displaceable by the front wheel of a vehicle approaching said barrier device, yet constituting a mental hazard to the operator of the vehicle, thereby causing him to stop the latter before said front wheel contacts said hazard.

GLEN S. STRATTON.

References Cited in the file of this patent

UNITED STATES PATENTS

| Number    | Name      | Date           |
|-----------|-----------|----------------|
| 1,577,173 | Capra     | Mar. 16, 1926  |
| 1,726,724 | Warren    | Sept. 3, 1929  |
| 1,783,579 | McGrath   | Dec. 2, 1930   |
| 2,073,834 | Duany et al. | Mar. 16, 1937 |
| 2,094,216 | Hunter    | Sept. 28, 1937 |
| 2,240,948 | Evans     | May 6, 1941    |
| 2,358,747 | Teetor    | Sept. 19, 1944 |
| 2,528,790 | Scherer   | Nov. 7, 1950   |

FOREIGN PATENTS

| Number  | Country | Date         |
|---------|---------|--------------|
| 307,818 | Italy   | May 15, 1933 |